Feb. 15, 1944. T. A. GEY 2,341,608
FASTENER MEANS FOR BANDS AND THE LIKE
Filed Dec. 5, 1942 2 Sheets-Sheet 1
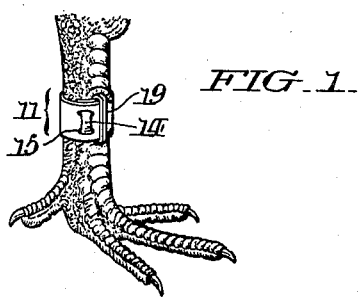
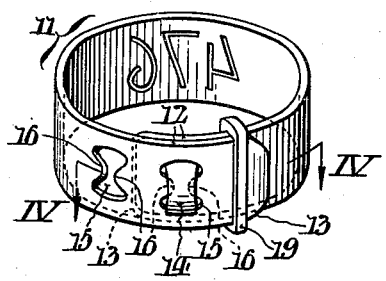
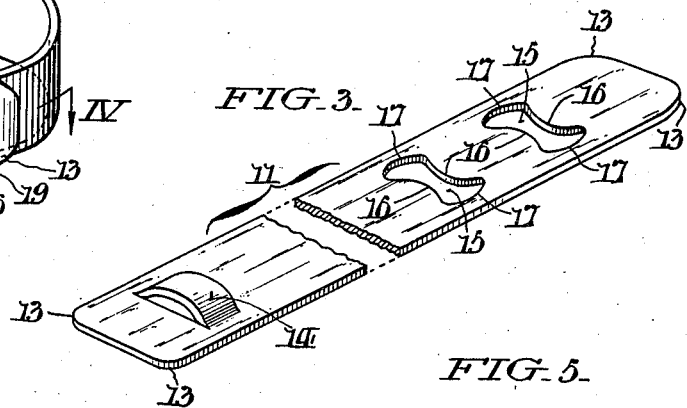
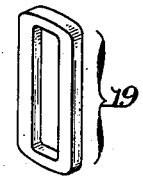
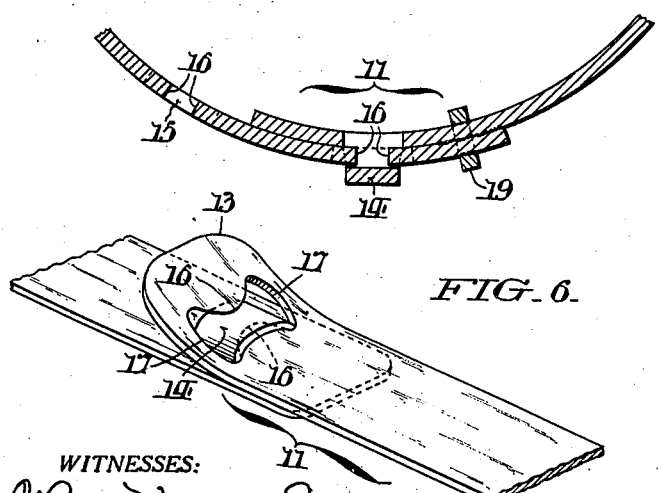
INVENTOR:
Theodore A. Gey,
BY Paul & Paul
ATTORNEYS.

Feb. 15, 1944. T. A. GEY 2,341,608
FASTENER MEANS FOR BANDS AND THE LIKE
Filed Dec. 5, 1942 2 Sheets—Sheet 2
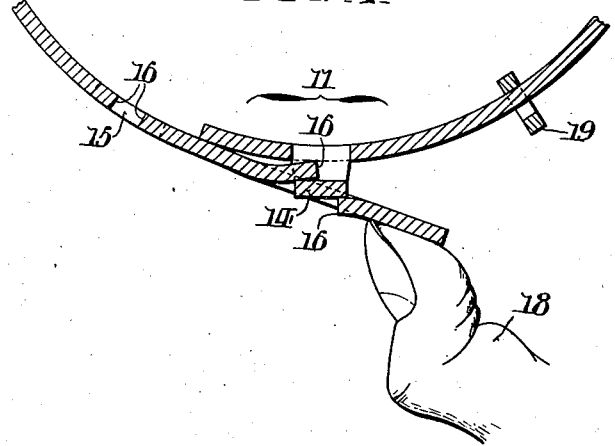
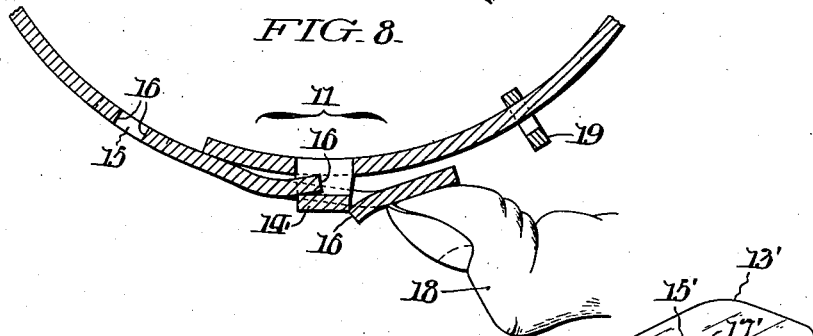
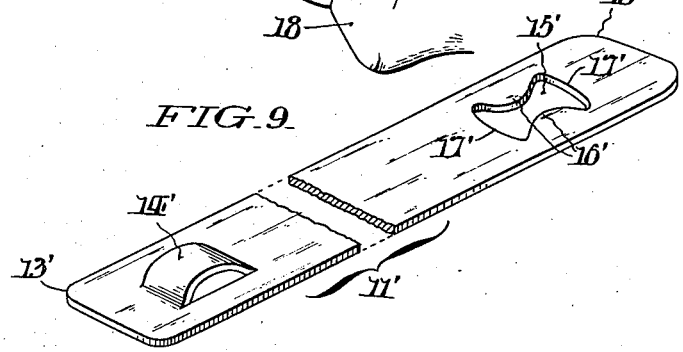
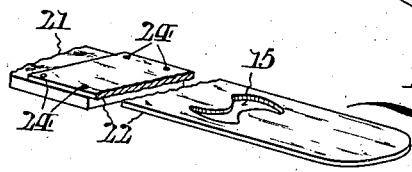
INVENTOR:
Theodore A. Gey,
BY
ATTORNEYS.

Patented Feb. 15, 1944

2,341,608

UNITED STATES PATENT OFFICE 2,341,608

FASTENER MEANS FOR BANDS AND THE LIKE

Theodore A. Gey, Norristown, Pa.

Application December 5, 1942, Serial No. 467,925

7 Claims. (Cl. 24—16)

This invention has reference in its broader aspect to bands, belts and the like, primarily designed for application around a limb or the body of animate and inanimate beings or objects for identification purposes, or for holding in place coverings and so forth.

A primary object of this invention is the provision of a novel identification band, conveniently although not essentially, for encircling a bird's leg, which is durable, tough, pliable and weather resistant.

Another object is the provision of an encircling band, belt or the like of the character indicated, in the preceding paragraph, which embodies novel snap-fastening or securing means; the same being preferably made of plastic material capable of integration upon application of a drop of suitable solution to the region of juncture, so that said band cannot be released, or tampered with, without ready detection.

A further object of this invention is the provision of a plastic material adjustable fastener which is well adapted for use as a clasping means for detachably securing straps for closing light weight, receptacles and containers, or body belts for holding apparel in position on the wearer.

While the stated objects are indicative in a general way of the aims of this invention others, with ancillary advantages, will become apparent to those skilled in the art upon an understanding of the formation and interengagement of the ends of the novel band means, or buckling device, hereinafter disclosed; while it will be evident that the size, proportions and minor details may be varied without departing from the spirit and scope of the concluding claims.

In the drawings:

Fig. 1 is a perspective view showing the adaptation of this invention as a leg band for birds.

Fig. 2 is a perspective view of the novel band or encircling device as in the form of an identification means.

Fig. 3 is a broken perspective view of the band before application, or as uncoiled.

Fig. 4 is a fragmentary section, taken as indicated by the angle arrows IV—IV in Fig. 2.

Fig. 5 is a perspective view of a clasp or element useful for locally integrating the overlapped ends of the band, hereinafter fully explained.

Fig. 6 is a fragmentary perspective view illustrative of the first step involved in connecting the ends of the band together.

Fig. 7 is a fragmentary section, along the lines of Fig. 4, illustrating the second step in connecting the ends of the band together.

Fig. 8 is a similar section, to that of Fig. 7, showing the parts in the position preparatory to snap engagement.

Fig. 9 is a broken perspective view of a slightly modified form of the invention; and, Fig. 10 is a broken perspective view illustrative of the adaptation of this invention for connecting together the ends of a conventional waist belt.

In describing the forms of this invention, exemplified by the above captioned drawings herewith, specific terms will be employed for the sake of clarity; but it is to be understood the scope of said invention is not thereby limited, as each such term is intended to embrace all equivalents which perform the same function for an analogous purpose.

Referring more in detail to the drawings, the novel band, comprehensively designated 11, of this invention is blanked out, in strip form, of suitable plastic material sheet, such as "ethocel" for example. Each band or strip 11 is obviously of the requisite dimensions, longitudinally and transversely so that, when coiled, an adjustable overlap 12, Fig. 2, is provided; while said band has the corners rounded at 13. One end of the band or strip 11 is provided with a corrugate and planarly outset securing loop 14, whereas the other end portion of said strip is formed with one or more undulate openings 15 preferably shaped, as well understood from Figs. 2 and 3, to define opposed longitudinally-actuable clasps or convex snap latches 16, with intervening concave-clearances 17, at right angles thereto, for free passage of the loop 14 aforesaid. It is to be particularly noted that the latches 16 are, preferably, longitudinally directed for corresponding functionality lengthwise of the strip or band 11, when the latter is in use; although said latches may be transversely disposed, as shown at 16' in Fig. 9; with the loop 14' located across the strip 11' for corresponding coaction with the latches 16', in an obvious manner.

When the ends of the band 11 are brought together in overlapped relation, and one of the snap latches 16 is engaged below the securing loop 14, as shown in Fig. 6; it will be clearly apparent that by inward pressure of a finger end 18, Fig. 7, the opposed latch 16 can be outwardly flexed as indicated in Fig. 8, until its free edge will automatically snap beneath the loop 14, see Fig. 4, due to the inherent flexibility and tenacity of the band 11; whereupon said parts can be united by a drop of appropriate solution such as conventional household fluid cement. Now it will be self-evident the overlapped ends 12 of the band 11 are arrestively engaged and cannot be separated without fracture of the loop 14 or considerable difficulty. However, in order to better retain and hold the overlaps 12, of the band 11, against curling I preferably make use of a loop 19 which is slidable along the band 11 into snug engagement over said overlaps, as best shown in Figs. 1, 2 and 4, whereupon application of a drop of the above mentioned solution will integrate said parts as typically indicated in Fig. 4.

Fig. 10 shows the adaptation of this invention to a waist-belt 21, and it is to be remarked the band is preferably severed into two parts 22, 23; the former of which includes the openings 15, whereas the latter embodies the securing loop 14; while both of said parts are appropriately attached to the belt 21 as by stitching or rivets 24 in an obvious manner.

Having thus described my invention, I claim:

1. An encircling band or the like comprising a plastic material strip having proximate one end a curviform and planarly-outset securing loop, a curviform opening or openings through the other end of said strip, and each such opening including opposed curvilinear latch portions with intervening clearances, one of such latch portions being insertable below the securing loop when the strip ends are overlapped, with the other latch portion capable of outward flexure into snap engagement below said loop to secure the overlapping ends against separation.

2. An encircling band or the like in accordance with claim 1 wherein the latch portions are longitudinally directed relative to the strip for corresponding functionality when the band or the like is in use.

3. An encircling band or the like in accordance with claim 1 wherein the latch portions are transversely directed relative to the strip for corresponding functionality when the band or the like is in use.

4. An encircling band or the like in accordance with claim 1 wherein the securing loop is of corrugate-formation, and each opening includes opposed flexible convex snap-latch portions with intervening concave-clearances.

5. An encircling band or belt fastener comprising a plastic material strip having proximate one end a curviform and planarly-outset securing loop, spacedly-aligned curvilinear openings through the other end portion of said strip, each such opening including opposed curvilinear snap-latching portions with intervening concave-clearances for passage of the securing loop and snap coaction of one of the latching parts therebelow when said ends are overlapped, and means for integrating the overlaps.

6. An encircling band or strap fastening means in accordance with claim 5 wherein a slidable loop of the plastic material is snugly engageable over the overlapped ends of the band or strap means, and said loop is integrated thereto.

7. A waist-belt fastener in accordance with claim 1 wherein the strip is cut into two parts, and said parts are individually attached to the respective ends of the belt.

THEODORE A. GEY.